Oct. 6, 1970      J. C. MAYS      3,532,334
VEHICLE STABILIZING ASSEMBLIES
Filed Dec. 20, 1967      2 Sheets-Sheet 1
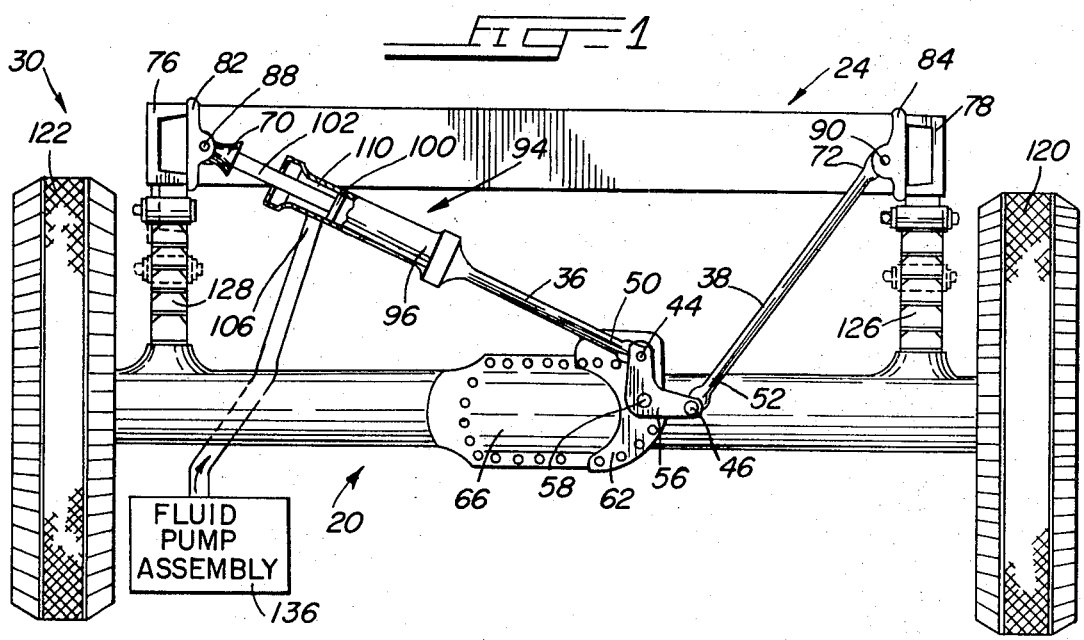
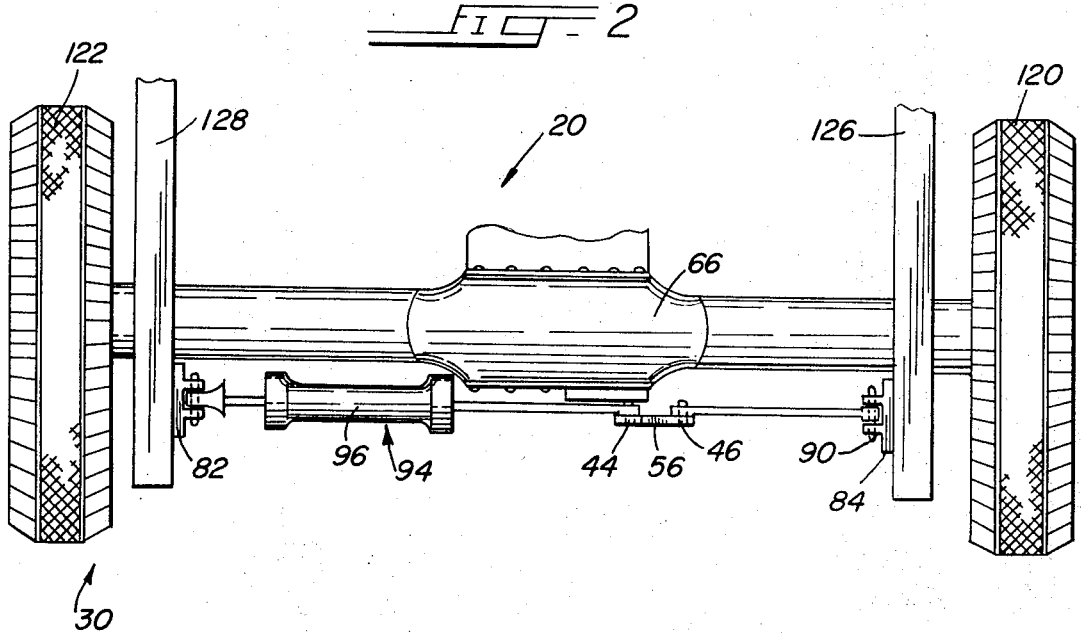
INVENTOR.
JOHN C. MAYS
BY Kegan, Kegan & Berkman
ATTYS.

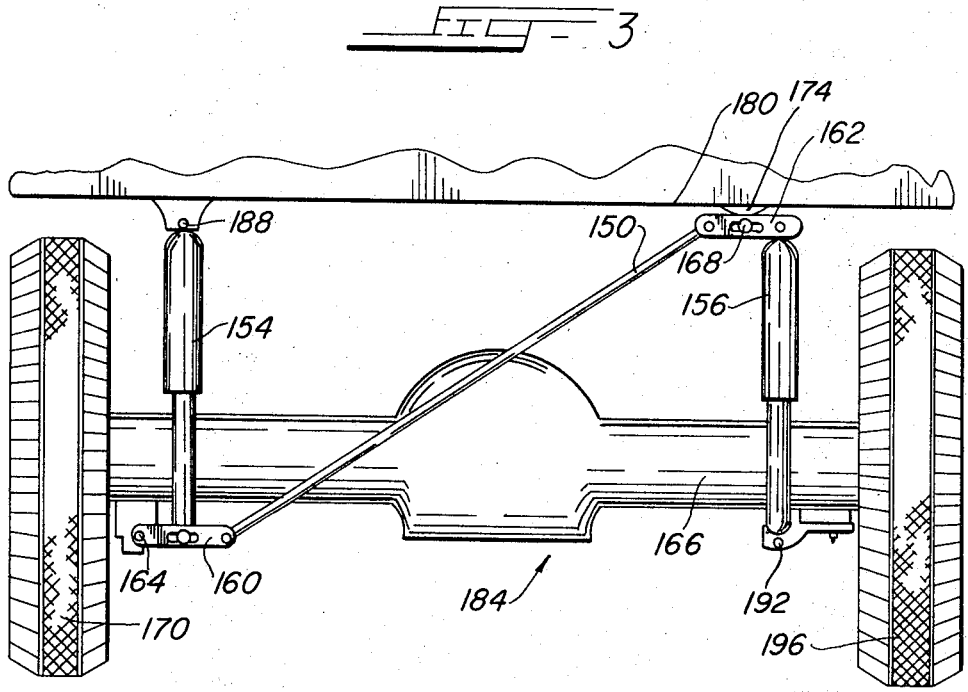
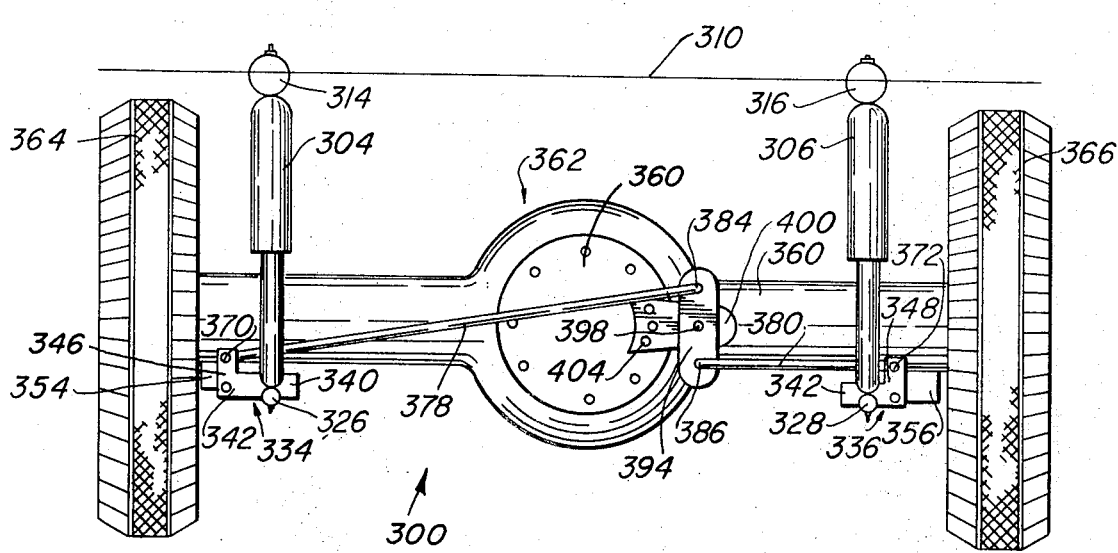

United States Patent Office 3,532,334
Patented Oct. 6, 1970

3,532,334
VEHICLE STABILIZING ASSEMBLIES
John C. Mays, Vero Beach, Fla., assignor to Cooper-Mays Harvesters, Inc., Vero Beach, Fla., a corporation of Florida
Filed Dec. 20, 1967, Ser. No. 692,033
Int. Cl. B60g 19/06; B62d 37/00
U.S. Cl. 267—12
1 Claim

ABSTRACT OF THE DISCLOSURE

A vehicle stabilizing linkage assembly bridging between and interconnecting opposite sides of a frame of a load-carrying vehicle and including a pivotal link in combination with lever means and hydraulic piston and cylinder means operative to compensate and correct for loads and forces applied unsymmetrically to the vehicle frame.

---

This invention relates to improved vehicle leveling and stabilizing assemblies. More particularly, the invention is directed to load distributing linkage effective, in response to a vertically directed force applied to one side of a vehicle frame, automatically to effect transmittal of a correlated or balancing vertical force to the other side of the vehicle frame to promote automatic leveling of the frame.

Many mechanical, hydraulic, and mechanico-hydraulic structural arrangements and combinations for stabilizing vehicles and compensating for asymmetrically applied loads or forces to promote a leveling of the vehicle are known in the prior art. However, each of these known systems has one or more undesirable or objectional features and none has proven completely satisfactory for its intended purpose. Some of the prior art systems are unduly complex; others are too costly. Still others are functionally inept. It is, therefore, the aim of the present invention to provide novel, simple yet highly effective vehicle leveling and stabilizing assemblies obviating the shortcomings of prior art arrangements.

It is a principal object of the invention to provide improved, automatically operating, stabilizing and leveling assemblies which are effective to distribute asymmetrically applied loads and to overcome frame tilting forces resulting therefrom.

It is another object of the invention to provide vehicle leveling and stabilizing frame-bridging linkage which includes a selectively actuable hydraulic piston and cylinder assembly adapted upon energization to change the length of one arm of the linkage thereby to cause a responsive shift in vertical position of a second arm in the linkage to establish a releveling of the frame after application of a frame-tilting load thereto.

Yet another object of the invention is to provide improved vehicle leveling and stabilizing systems which are simple yet highly effective to distribute and neutralize imbalancing stresses applied to load-supporting frames of vehicles.

Other objects, features, and advantages of the invention will become apparent from a reading of the following specification taken in conjunction with the drawing in which:

FIG. 1 is a fragmentary diagrammatic rear elevational view of a vehicle wheel and axle assembly and illustrating one embodiment of the leveling and stabilizing system of the invention;

FIG. 2 is a top plan view of the structure of FIG. 1;

FIG. 3 is a view similar to FIG. 1 but showing another form of a stabilizing system according to the invention; and FIG. 4 is a view similar to FIGS. 1 and 3 and showing still another form of the invention.

The aims and objects of the invention are accomplished by providing novel arrangements of cooperating linkage and lever elements which bridge or span and intercouple opposite sides of the frame of a vehicle, and which are automatically responsive to forces applied preferentially to one side of the frame to transmit a compensating force to the other side of the frame. In some preferred embodiments of the invention the links and levers cooperate with and are aided by shock absorber elements at opposed sides of the vehicle frame, and in one preferred form of the invention a single pressurized hydraulic assembly is used to apply a lifting force to that side of the vehicle frame to which an unbalancing stress has been applied, while at the same time applying a downwardly directed force to the opposite side of the frame.

Referring now to the drawing and particularly to FIGS. 1 and 2, one preferred embodiment of stabilizing and leveling assembly 20 of the invention is illustrated as bridging, extending across or spanning the width of the frame 24 of a vehicle 30, only a fragmentary portion of the vehicle and its frame being shown. The assembly 20 includes a pair of upwardly and frame-mounted outwardly extending pivotal lever arms, bars, or shafts 36 and 38 carried on pivot pins 44 and 46 and coupled to one another at their lower ends 50 and 52 through an L-shaped link 56 pivotally secured through a pin 58 to a bracket 62 which is in turn fixed to the axle housing 66 at a position preferable off-center with respect to a lateral midpoint of the load-carrying vehicle. At their upper ends 70 and 72 the lever arms 36 and 38 are pivotally anchored at opposite channel-like chassis frame members 76 and 78 through brackets 82 and 84 welded, bolted, or otherwise secured to the frame members. The lever arms 36 and 38 pivot at their upper ends on pivot pins 88 and 89 carried by the brackets 82 and 84.

Interposed in-line between end limits 50 and 70 of one lever arm 36 is a hydraulically actuated piston and cylinder assembly 94 which includes a cylinder 96, a piston 100, and a piston rod 102 as well as a conduit 106 for delivery of pressurized fluid to the chamber 110 to drive the piston inwardly of the cylinder 96 as more fully described herebelow.

In one important application the invention serves as a most effective means for stabilizing and leveling a vehicle-carried, motorized, hydraulically actuated fruit harvesting apparatus. Such an apparatus is the subject matter of U.S. patent application Ser. No. 600,410 filed Dec. 9, 1966, and the entire disclosure of that application is hereby incorporated herein by reference. A major mechanical component of the harvesting apparatus is a fruit picking boom which, in use, extends laterally outwardly and upwardly causing an objectionable imbalance of weight on the boom supporting chassis. With such a boom projecting to the right of the support vehicle 30 shown in FIG. 1, considerably more weight bears upon the right wheel 120 than upon the left wheel 122 with a corresponding greater compression of the right hand spring 126 than the left hand spring 128 so that the frame 24 is shifted, displaced, or pivoted angularly in a clockwise direction and assumes an undesirable tilt.

In accordance with the practice of the invention, and with particular reference to the structure illustrated in FIG. 1, the tilted frame 24 is leveled by applying hydraulic pressure to the left side of the piston 100, using a fluid pump assembly 136 which is conventional and which is preferably part of the hydraulic system of the harvesting apparatus. The applied pressure moves the piston 100 inwardly of the cylinder 96 effectively to shorten the lever arm 36 and to pull the left side of frame 24 down. At the same time the link 56 is rotated counterclockwise shifting the arm 13 of the link 56 upwardly and lifting the right side of the frame 24 through the lever arm 38. The overall effect is to urge the frame 24 to return to a level position. It will be appreciated that when the vehicle 30 on which the frame 24 is carried travels and traverses irregular terrain, the piston and cylinder assembly 94 will function as a shock absorbing system to neutralize shocks communicated to the vehicle.

A second embodiment of a leveling and stabilizing assembly according to the invention is shown in FIG. 3, as including a transfer bar or sway bar 150 extending diagonally between and interconnecting a pair of shock absorber units 154 and 156 through pivotal links 160 and 162, the link 160 associated with the first shock absorber unit 154 being secured at its end 164 to the axle housing 166 near the left wheel 170 and the other link 162 being anchored at 174 to the frame 180 at the opposite side of the wheel and axle assembly 184, suitable brackets being provided. The upper end of the first shock absorber unit 154 is pivotally affixed 188 to the left side of the frame and the lower end of the second unit 156 is anchored 192 to the axle housing 166 near the right wheel 196.

A downward stress applied to the right side of the frame 180 acts through the shock absorber unit 156, the link 162, and the sway bar 150 to pivot the link 160 clockwise to shift the left side of the frame 180 downwardly, momentarily, and thus to stabilize the frame.

A third embodiment of a leveling and stabilizing assembly according to the invention is shown diagrammatically in FIG. 4. The assembly 300 consists of a pair of shock absorber units 304 and 306 positioned at opposite sides of a vehicle frame 310. The shock absorber units extend in generally vertical planes and are fastened at their upper ends 314 and 316 to the frame 310. At their opposite ends the units 304 and 306 are each pivotally secured by means of pivot pins 326 and 328 to respective L-shaped links 334 and 336 at the ends of inwardly extending arms 340 and 342 thereof. The links 334 and 336 are pivotally mounted adjacent the junctures of their angularly disposed arms 340 and 346 and 342 and 348 to brackets 354 and 356 secured to the axle housing 360 of the wheel and axle assembly 362, near the opposed wheels 364 and 366. The upwardly directed arms 346 and 348 of the links 334 and 336 are pivotally connected 370 and 372 at their ends to shafts, rods, or bars 378 and 380 extending generally inwardly from the sides of the frame carrying vehicle, and the inward extremities 384 and 386 of the rods 378 and 380 are pivotally joined to upper and lower ends and to a plate 394 which is in turn pivotally secured at a point intermediate its ends by means of a pin 398 to a bracket or flange 400, the latter being bolted 404 or otherwise affixed to the axle housing 360 at a position, as shown in FIG. 4.

Upon application of a downwardly directed shock impulse or force to the right side of the frame 310, the force acts through the shock absorber unit 306, the link 336, and the rod 380 to rotate the plate 394 clockwise thereby pulling the rod 378 to the right and, through link 334, shifting the other shock absorber unit 304 downwardly to effect a cushioning of the applied shock and a leveling of the frame.

In the embodiments of the invention illustrated in FIGS. 3 and 4 the conventional axle-carried, frame-supporting spring assemblies and their securing shackles have been omitted in the interest of promoting clarity of the remaining structures. The many pivot points are of conventional design as are the shock absorber units and, accordingly, no further descriptions of these structural features are necessary. Pivotal connections of "shocks," links and shafts may be made through rubber bushings or other suitable means.

The shock absorber units of the assemblies shown in FIGS. 3 and 4 may be replaced with hydraulic cylinders and accumulators. Alternatively solid linkage in combination with a single shock absorber or with a sway bar may be used. In still another system, it is contemplated that hydraulic cylinders may be used in conjunction with each shock absorber, transfer motions being effected through hydraulic lines rather than mechanical linkage.

While several preferred examples of the vehicle leveling and stabilizing assemblies of the invention have been described, various changes may be made in the details of construction without departing from the spirit and the underlying principles of the invention. It is, therefore, desired by the following claim to include in the scope of the invention all such variations and modifications by which substantially the results of this invention may be obtained through the use of substantially the same or equivalent means.

What is claimed is:

1. In apparatus for leveling and stabilizing a load-bearing vehicle having a yieldably supported load-carrying frame:

a pivotal link;

pin means pivotally supporting said link at a position intermediate opposite end portions thereof for arcuate movement in a substantially vertical plane extending generally transversely of a longitudinal axis of said frame;

said pin means being mounted below said frame of said vehicle between a pair of axle-carried support wheels thereof;

an elongated first lever arm pivotally secured at one end to an end of said link and pivotally coupled at its other end to said frame at one side of said vehicle;

a second lever arm pivotally secured at one end to the other end of said link and pivotally coupled at its other end to said frame at an opposite side of said vehicle;

a hydraulically actuated piston and cylinder assembly interposed between end limits of said first lever arm and operable selectively to lengthen and to shorten said first lever arm to effect hydraulically powered leveling of said vehicle through said pivotal link and said second lever arm to correct tilting of said vehicle induced through application of an unbalancing loading force thereto;

said first and said second lever arms diverging upwardly and outwardly at different angles from respective points of coupling of said arms to said pivotal link and constituting, in combination with interconnecting said link, bridging means spanning between and intercoupling opposite sides of said frame and said vehicle;

said piston and cylinder carrying first lever arm extending upwardly at angle of elevation which is less than an angle of elevation of said second lever arm, a decrease in overall length of said first lever arm effected through actuation of said piston and cylinder assembly producing arcuate movement of said pivotal link about said pin means to provide upward shifting of the link-coupled second lever arm, thereby effecting a lifting of said frame at its point of attachment to said second lever arm;

whereby, upon application of a vertically directed force at one side of said frame, said bridging means is responsive automatically to effect transmittal of a correlated vertical force to the other side of said frame of said vehicle to establish a correspondence of forces acting on opposite sides of said frame to promote automatic leveling thereof.

References Cited

UNITED STATES PATENTS

| | | | |
|---|---|---|---|
| 19,102 | 1/1858 | Rollin | 267—12 |
| 1,222,401 | 4/1917 | Hess | 267—12 |
| 2,815,202 | 12/1957 | Post | 267—11 |
| 3,044,799 | 1/1962 | Fiala | 267—11 X |

FOREIGN PATENTS 411,183   4/1910   France.

A. HARRY LEVY, Primary Examiner

U.S. Cl. X.R.

280—6.11, 124